(12) United States Patent
Gorokhov et al.

(10) Patent No.: US 7,974,359 B2
(45) Date of Patent: Jul. 5, 2011

(54) METHODS AND APPARATUS FOR MITIGATING MULTI-ANTENNA CORRELATION EFFECT IN COMMUNICATION SYSTEMS

(75) Inventors: Alexei Gorokhov, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1430 days.

(21) Appl. No.: 11/022,418

(22) Filed: Dec. 22, 2004

(65) Prior Publication Data

US 2006/0146692 A1    Jul. 6, 2006

(51) Int. Cl.
*H04B 7/02*    (2006.01)
(52) U.S. Cl. ........ 375/267; 375/264; 375/260; 375/295; 375/265; 375/322; 370/345; 370/203; 370/208; 370/343; 370/334; 342/458
(58) Field of Classification Search .................. 375/267, 375/264, 265, 260, 295, 322; 370/208, 281, 370/345, 343, 334, 203; 342/458
See application file for complete search history.

(56) References Cited

U.S. PATENT DOCUMENTS

| 7,336,719 B2 * | 2/2008 | Gore et al. ............... 375/267 |
| 2002/0172293 A1 * | 11/2002 | Kuchi et al. ............... 375/267 |
| 2003/0032452 A1 | 2/2003 | Tong et al. |
| 2003/0139139 A1 | 7/2003 | Onggosanusi et al. |
| 2004/0008737 A1 | 1/2004 | McClelland |
| 2005/0074068 A1 * | 4/2005 | Borran et al. ............... 375/264 |
| 2005/0193047 A1 * | 9/2005 | Fu et al. ............... 708/300 |
| 2006/0030364 A1 * | 2/2006 | Olesen et al. ............... 455/562.1 |

FOREIGN PATENT DOCUMENTS

| EP | 05008164.5 | 4/2005 |
| EP | 1594244 A2 | 11/2005 |
| JP | 2001291602 | 4/2003 |
| JP | 2003101609 | 4/2003 |
| WO | WO 03/023996 | 3/2003 |

OTHER PUBLICATIONS

International Search Report—PCT/US2005/046686, Internatinal Searching Authority—European Patent Office—Jun. 20, 2006.
Written Opinion—PCT/US2005/046686, International Searching Authority—European Patent Office—Jun. 20, 2006.
International Preliminary Report on Patentability—PCT/US2005/046686, International Bureau of WIPO—Geneva, Switzerland—Jun. 26, 2007.

* cited by examiner

*Primary Examiner* — Eva Y Puente
(74) *Attorney, Agent, or Firm* — Sandip S. Minhas; Kenyon S. Jenckes

(57) ABSTRACT

The disclosed embodiments provide for methods and systems for transmitting a number of streams of modulation symbols by a multi-antenna transmitter. In one aspect, a method for transmitting a number of streams of modulation symbols by a multi-antenna transmitter includes the acts of transforming a first number of streams of symbols to a second number of streams of symbols, the first number being smaller than or to the second number; and transmitting the second number of streams of symbols by a transmitter having the second number of antennas.

10 Claims, 5 Drawing Sheets

DFT:

$$D = \frac{1}{\sqrt{N_T}} \begin{bmatrix} 1 & 1 & 1 & \cdots & 1 \\ 1 & e^{j\frac{2\pi}{N_T}} & e^{j\frac{2\pi}{N_T}\cdot 2} & & \\ 1 & e^{j\frac{2\pi}{N_T}\cdot 2} & e^{j\frac{2\pi}{N_T}\cdot 2\cdot 2} & & \\ \vdots & & & d_{P,q} = e^{j\frac{2\pi}{N_T}(P-1)(q-1)} & \\ 1 & & & & e^{j\frac{2\pi}{N_T}(N_T-1)^2} \end{bmatrix}_{N_T \times N_T}$$

FIG. 3A $$\Delta = \begin{bmatrix} e^{j\theta_1} & & & & \bigcirc \\ & e^{j\theta_2} & & & \\ & & \ddots & & \\ \bigcirc & & & & e^{j\theta_{N_T}} \end{bmatrix}_{N_T \times N_T}$$

METHODS AND APPARATUS FOR MITIGATING MULTI-ANTENNA CORRELATION EFFECT IN COMMUNICATION SYSTEMS

BACKGROUND

1. Field

The present invention relates generally to wireless communication and more specifically to techniques for mitigating the effect of correlation in a multi-antenna wireless communication system.

2. Background

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. Each of the $N_S$ independent channels corresponds to a dimension. The MIMO system can provide improved performance (e.g., higher throughput and/or greater reliability) if the additional dimensionalities created by the multiple transmit and receive antennas are utilized.

A multi-carrier MIMO system employs multiple carriers for data transmission. These multiple carriers may be provided by orthogonal frequency division multiplexing (OFDM) or some other construct. OFDM effectively partitions the overall system bandwidth into a number of ($N_F$) orthogonal subbands, which are also referred to as tones, frequency bins, and frequency sub-channels. With OFDM, each subband is associated with a respective carrier upon which data may be modulated. For a MIMO system that utilizes OFDM (i.e., a MIMO-OFDM system), the MIMO channel for each of the $N_F$ subbands may be decomposed into $N_S$ independent channels, resulting in a total of $N_S N_F$ independent channels.

In a wireless communication system, data to be transmitted is initially processed (e.g., coded and modulated) to form a stream of symbols. The symbol stream is then upconverted to radio frequency (RF) to generate an RF modulated signal that is more suitable for transmission over a wireless channel. For a MIMO system, up to $N_T$ RF modulated signals may be generated and transmitted in parallel from the $N_T$ transmit antennas. The $N_T$ transmitted signals may reach the $N_R$ receive antennas via a number of propagation paths and may experience different effective channels due to different effects of fading and multipath. Moreover, for a MIMO-OFDM system, the $N_F$ subbands of each transmitted signal may also experience different effective channels. Consequently, the $N_T$ transmitted signals may be associated with different complex channel gains and received signal-to-noise ratios (SNRs) that can vary across the $N_F$ subbands.

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

There is therefore a need in the art for mitigating the effect of correlation in a multi-antenna wireless communication system.

SUMMARY

The disclosed embodiments provide for methods and systems for transmitting a number of streams of modulation symbols by a multi-antenna transmitter. In one aspect, a method for transmitting a number of streams of modulation symbols by a multi-antenna transmitter includes the acts of transforming a first number of streams of symbols to a second number of streams of symbols, the first number being smaller than or equal to the second number, and transmitting the second number of streams of symbols by a transmitter having the second number of antennas.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIGS. 3A and 3B show one embodiment for implementing vector rotation;

DETAILED DESCRIPTION

Figure 1A:
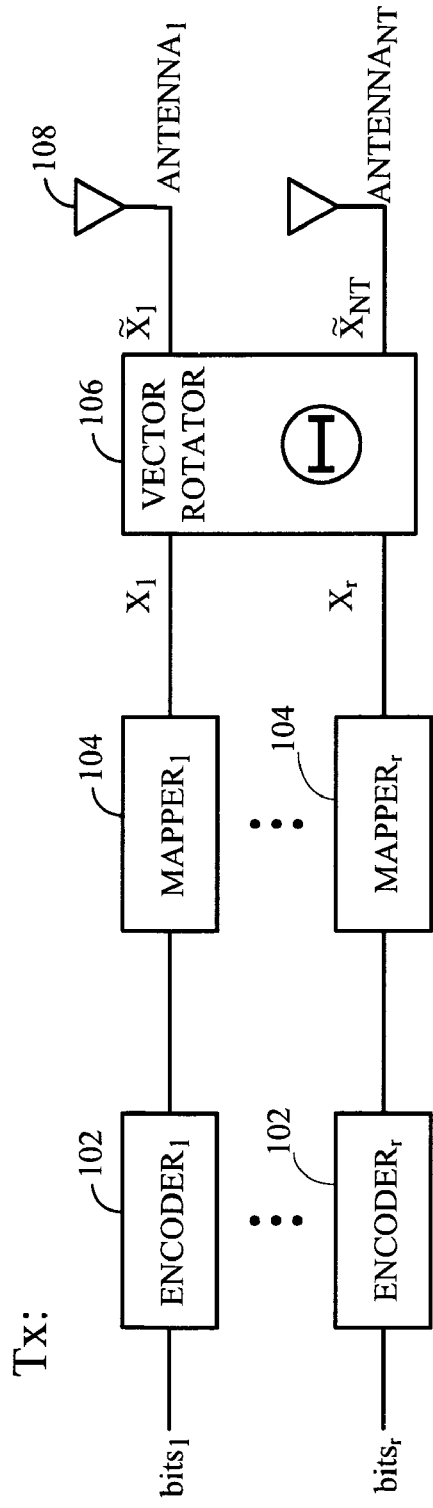
FIGS. 1A and 1B show two embodiments for transmitting streams of modulation symbols by a multi-antenna transmitter.

The word "exemplary" is used herein to mean "serving as an example, instance, or illustration." Any embodiment or design described herein is "exemplary" and is not necessarily to be construed as preferred or advantageous over other embodiments or designs.

In one embodiment, in a MIMO system, a number of streams of symbols are transmitted by a multi-antenna transmitter and received by a multi-antenna receiver. A model for a MIMO system may be expressed as:

$$y(s)=H(s)x(s)+n(s), \text{ for } s\in S, \qquad \text{Eq.(1)}$$

where x(s) is an $\{N_T \times 1\}$ "transmit" vector with $N_T$ entries for $N_T$ symbols or data streams transmitted from the $N_T$ transmit antennas;

y(s) is an $\{N_R \times 1\}$ "receive" vector with $N_R$ entries for $N_R$ symbols or data streams received on the $N_R$ receive antennas;

H(s) is the $\{N_R\}\times\{N_T\}$ channel response matrix;

n(s) is a vector of additive white Gaussian noise (AWGN); and s may correspond to a time-division (s represents a time instance), frequency-division (s represents a frequency instance), time-frequency-division (s represents an instance in time-frequency space) or code division (s represents a code value) multiplexing algorithm.

The vector n(s) is assumed to have zero mean and a covariance matrix of $\Lambda_n = \sigma^2 I$, where I is the identity matrix with ones along the diagonal and zeros everywhere else, and $\sigma^2$ is the variance of the noise.

The channel response matrix H(s) may not have full-rank for all instances of s. Assuming the rank of H(s) to be "r," which may be determined by the transmitter, receiver, or both, r streams of modulation symbols may be transmitted by r antennas. In this case, letting $H(s) = [h_1(s)\ h_2(s)\ \ldots\ h_{N_t}(s)]$ to represent the channel response matrix at a given instance of s, and $h_i$ to represent the $\{N_T \times 1\}$ channel response vector corresponding to transmit antenna i and all receive antennas, the received signal at the given instance of s, e.g., time, frequency, time-frequency, or code, would be defined as:

$$r(s) = \sum_{i=1}^{r} h_i(s)x_i(s) + n(s). \qquad \text{Eq. (2)}$$

Depending on the directions of $h_i(s)$, the symbol SNR can vary dramatically. If for instance, the r antennas picked for transmission at a given instance of s have two or more highly correlated $h_i$s, the corresponding SNR will be too low. On the other extreme, if $h_i$s are close to being orthogonal, the SNR will be high. Hence, some packets and/or symbols may enjoy high SNRs while others may suffer low SNRs, depending on the channel characteristics. Moreover, if a packet spans over multiple symbols, different symbols may encounter the same SNR.

In one embodiment, instead of choosing r antennas to transmit r modulation symbols, which may result in poor SNR due to correlation effect in the transmit antennas, r modulation symbols are transmitted by $N_T$ antennas. In this case, the r×1 vector x(s) is randomly rotated by an orthogonal vector rotation matrix $\Theta(s)$, e.g., of dimension $N_T \times r$. That is, the new transmitted vector of dimension $\{N_T \times 1\}$ would be:

$$\tilde{x}(s) = \Theta(s)x(s). \qquad \text{Eq. (3)}$$

The effect of $\Theta(s)$ is to randomize the direction by which each symbol $x_i(s)$ is received. Accordingly, the received symbols, in vector form, would be:

$$\begin{aligned} r(s) &= H(s)\Theta(s)x(s) + n(s) \\ &= \tilde{H}(s)x(s) + n(s) \\ &= \sum_{i=1}^{r} \tilde{h}_i(s)x_i(s) + n(s). \end{aligned} \qquad \text{Eq. (4)}$$

In this case, irrespective of the correlation between antennas, the modulation symbols are received in random directions. Moreover, for the same instance of s, different modulation symbols encounter different effective channel responses $\{\tilde{h}_i(s)\}$. This randomization in directions prevents severe correlation among multiple transmit antennas.

Figure 1B:
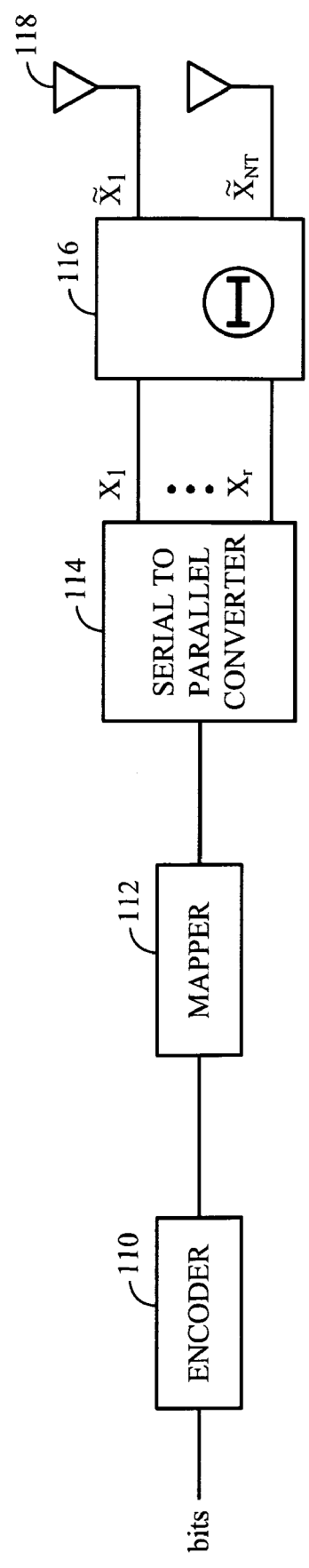

FIG. 1 shows two embodiments for transmitting r streams of modulation symbols by $N_T$ antennas. In FIG. 1A, a first number, e.g., r, of streams of bits is selected, e.g., by a transmitter, for transmission by $N_T$ antennas. This selection may be based on the rank (r) of the channel response matrix H(k), as discussed above. In one embodiment, the selected streams of modulation symbols may be processed by encoders 102 and mappers 104, and transformed from r streams of modulation symbols, via the vector rotator 106, to $N_T$ streams of symbols for transmission by $N_T$ antennas 108. Alternatively, as in FIG. 1B, the transmitter may process one or more streams of data bits by encoder 110 and mapper 112, and transform the stream of modulation symbols, via serial-to-parallel converter 114, to r streams of modulation symbols. In one embodiment, the r streams of modulation symbols may be transformed, via the vector rotator 116, to $N_T$ streams of symbols for transmission by $N_T$ antennas 118.

Figure 2:
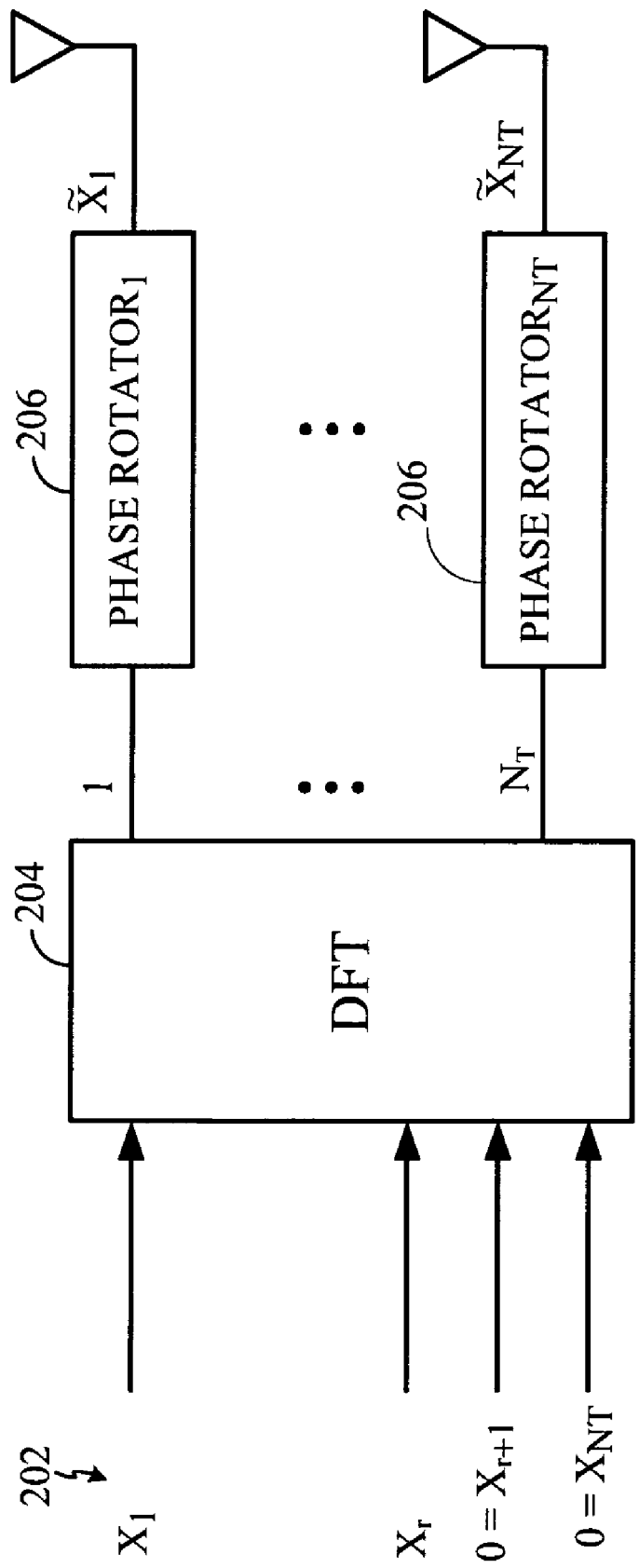
FIG. 2 shows one embodiment for transforming streams of modulation symbols for transmission by the multi-antenna transmitter of FIG. 1A or FIG. 1B.

In one embodiment, the r streams of modulation symbols are transformed to $N_T$ streams of symbols by a vector rotator matrix $\Theta$, which may include a discrete Fourier transform (DFT) operation followed by phase shift operation. FIG. 2 shows one embodiment for transforming r streams of modulation symbols $\{X_1, X_2, \ldots, X_r\}$ for transmission by the $N_T$-antennas transmitter 108, 118. In one embodiment, the r streams of modulation symbols may be augmented by enough number, e.g., $N_T$-r, of known pilots, e.g., "0" entries, as shown by 202, to provide $N_T$ inputs to a discrete Fourier transform (DFT) unit 204. In one embodiment, the discrete Fourier transform 204 is implemented/represented by an $N_T \times N_T$ unitary square matrix as shown in FIG. 3A and repeated below:

$$D = \frac{1}{\sqrt{N_T}} \qquad \text{Eq. (5)}$$

$$\begin{bmatrix} 1 & 1 & 1 & \cdots & & 1 \\ 1 & e^{j\frac{2\pi}{N_T}} & e^{j\frac{2\pi}{N_T} \cdot 2} & & & \\ 1 & e^{j\frac{2\pi}{N_T} \cdot 2} & e^{j\frac{2\pi}{N_T} \cdot 2 \cdot 2} & & & \\ \vdots & & & \ddots & & \\ & & & & d_{P,q} = e^{j\frac{2\pi}{N_T}(P-1)(q-1)} & \\ 1 & & & & & \ddots \\ & & & & & e^{j\frac{2\pi}{N_T}(N_T-1)^2} \end{bmatrix}_{N_T \times N_T}$$

In one embodiment, the $N_T$ outputs of the DFT unit 204 are phase shifted by phase rotators 206. In one embodiment, phase rotations are implemented/represented by an $N_T \times N_T$ unitary diagonal square matrix, as shown in FIG. 3B, and repeated below:

$$\Delta = \begin{bmatrix} e^{j\theta_1} & & & \\ & e^{j\theta_2} & & \bigcirc \\ & & \ddots & \\ & \bigcirc & & e^{j\theta_{N_T}} \end{bmatrix}_{N_T \times N_T} \qquad \text{Eq. (6)}$$

where $\theta_i \in [-\pi\ \pi]$ may be uniformly distributed random variables. The random variables $\theta_i$, may be generated from a "seed," which may be communicated to the receiver side, in real-time or at a predetermined time, for generating similar random variables to reconstruct the vector rotator matrix $\Theta(s)$ In one embodiment, the vector rotator matrix $\Theta(s)$ is implemented by:

$$\Theta(s) = \Lambda D \qquad \text{Eq. 7}$$

where D is the unitary $N_T$-point DFT matrix, as defined above by Eq. (5), and $\Lambda$ is the $N_T$-point unitary diagonal square matrix, as defined by Eq. (6). This choice of $\Theta(s)$ may facilitate its implementation at the receiver side, e.g., when the number of transmit antennas ($N_T$) is a power of two, or $N_T$ may be decomposed into at least two prime numbers, efficient FFT techniques can be used to implement $\Theta(s)$.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Figure 4:
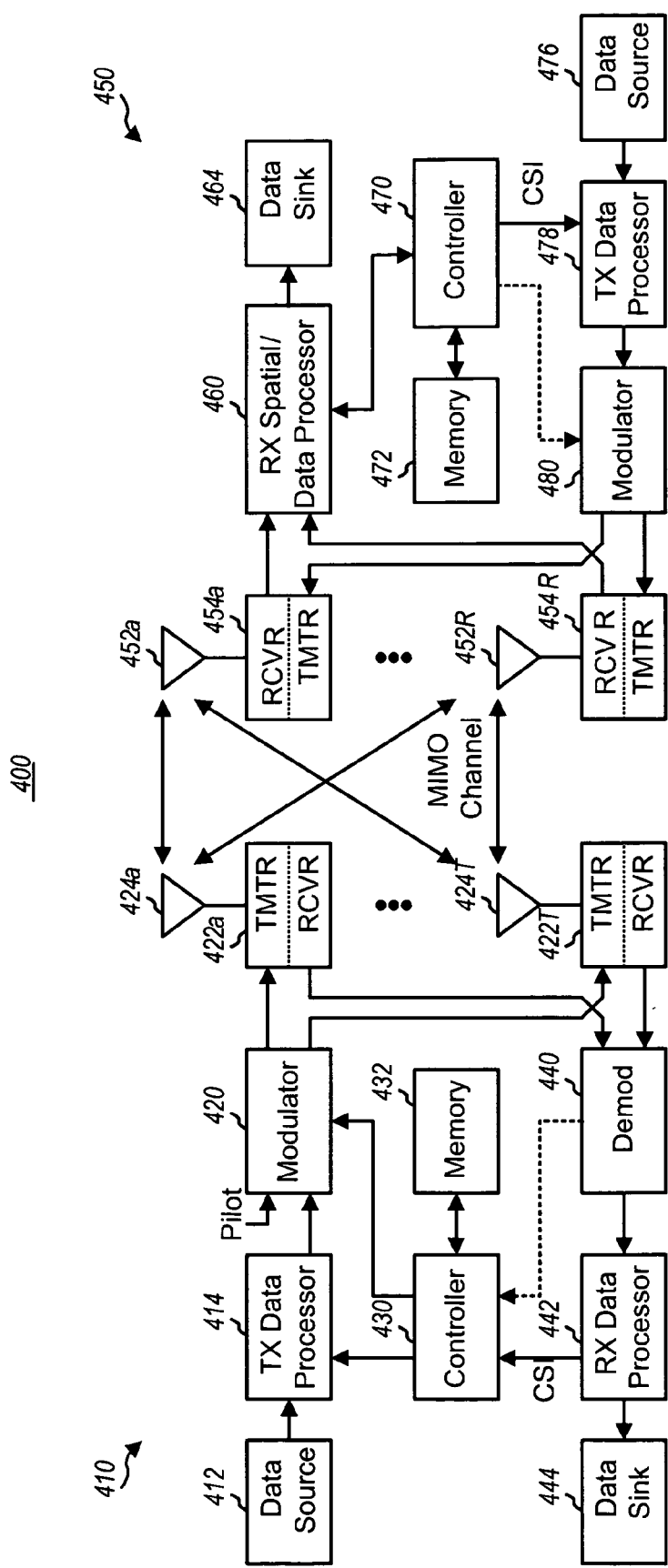
FIG. 4 shows a block diagram of a transmitter system and a receiver system.

FIG. 4 shows a block diagram of an embodiment of a transmitter system 410 and a receiver system 450 in a MIMO system 400, e.g., in an OFDMA environment. At transmitter system 410, data for one or multiple streams is provided by a data source 412, coded by a transmit (TX) data processor 414, and modulated by a modulator 420 to provide modulation symbols. The data rate, coding, and modulation for each stream may be determined by controls provided by a controller 430. The modulation symbols for all streams and pilot symbols are then multiplexed and further processed to provide $N_T$ symbol streams, which are further processed by $N_T$ transmitters (TMTR) 422a through 422T to provide $N_T$ RF modulated signals that are then transmitted from $N_T$ antennas 424a through 424T.

At receiver system 450, the $N_T$ transmitted signals are received by $N_R$ antennas 452a through 452R. Each receiver (RCVR) 454 processes a received signal from an associated antenna 452 to provide a corresponding received symbol stream. A receive (RX) spatial/data processor 460 then processes the $N_R$ received symbol streams from $N_R$ receivers 454 to provide $N_T$ detected symbol streams, and further processes each detected symbol stream to obtain decoded data for the stream.

RX spatial/data processor 460 may also derive an estimate of the channel response between the $N_T$ transmit and $N_R$ receive antennas (e.g., based on the pilot symbols) for each subband used for data transmission. The channel response estimate may be used to perform equalization at the receiver. RX spatial/data processor 460 may further estimate the SNRs of the detected symbol streams. Controller 470 may provide channel state information (CSI) regarding the MIMO channel and/or the received symbol streams (e.g., the received SNRs or rates for the symbol streams). The CSI is then processed by a TX data processor 478, modulated by a modulator 480, conditioned by transmitters 454a through 454R, and sent back to transmitter system 410.

At transmitter system 410, the modulated signals from receiver system 450 are received by antennas 424, conditioned by receivers 422, demodulated by a demodulator 440, and processed by an RX data processor 442 to recover the CSI sent by the receiver system. The CSI is then provided to controller 430 and may be used to (1) determine the number of symbol streams to transmit, (2) determine the rate and coding and modulation scheme to use for each symbol stream, (3) generate various controls for TX data processor 414 and modulator 420, and (4) DFT and phase rotate the streams of symbols, as discussed above.

Controllers 430 and 470 direct the operation at the transmitter and receiver systems, respectively. Memory units 432 and 472 provide storage for program codes and data used by controllers 430 and 470, respectively.

Figure 5:
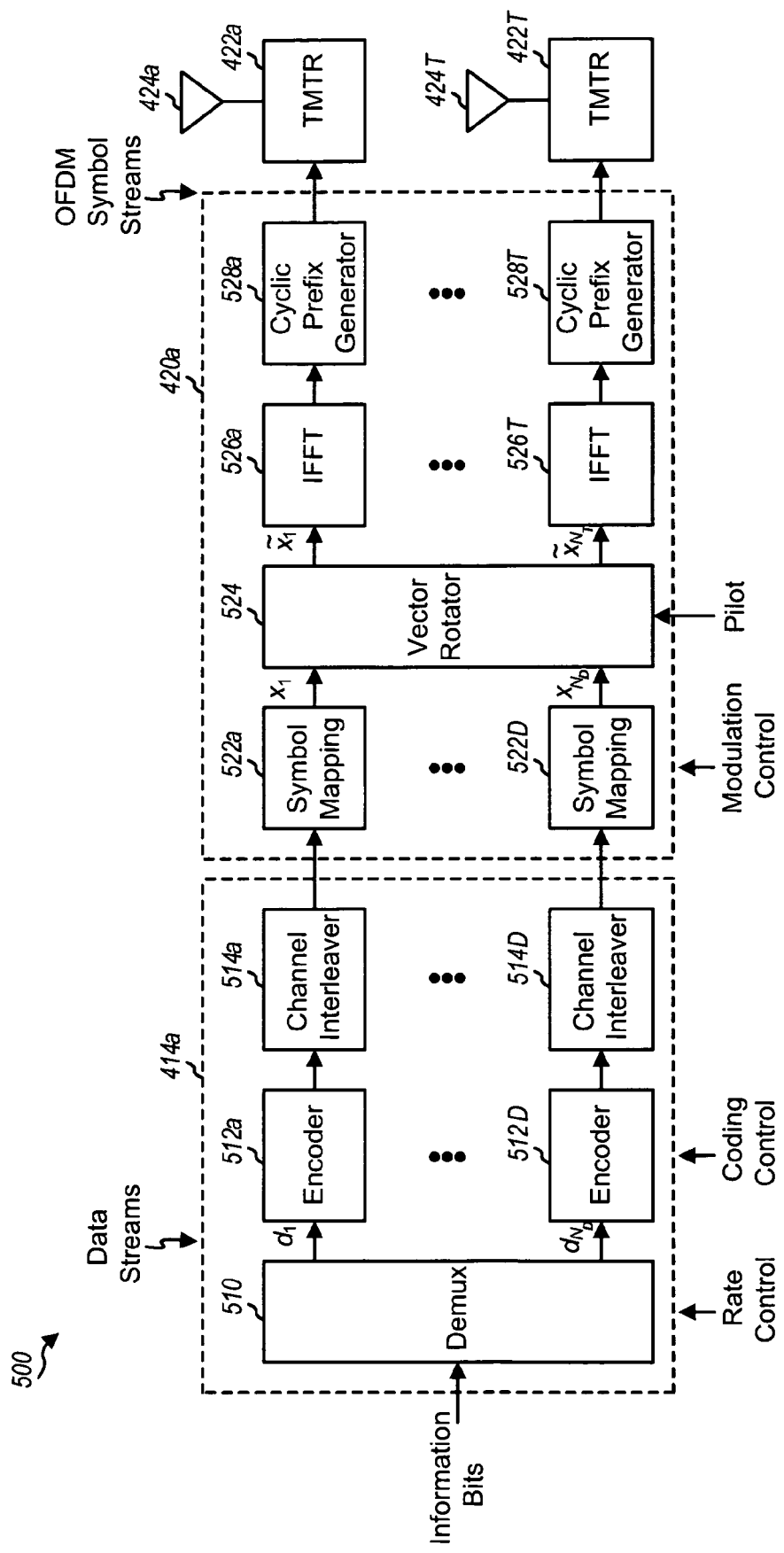
FIG. 5 shows a block diagram of a transmitter unit within the transmitter of FIG. 4.

FIG. 5 shows a block diagram of a transmitter unit 500, which is an embodiment of the transmitter portion of transmitter system 410 in FIG. 4, corresponding to FIG. 1A. In this embodiment, TX data processor 414a includes a demultiplexer 510, $N_D$ encoders 512a through 512D, and $N_D$ channel interleavers 514a through 514D (i.e., one set of encoder and channel interleaver for each stream). Demultiplexer 510 demultiplexes the data into $N_D$ data streams, where $N_D$ may be any integer from one to $N_T$, e.g., rank "r." Each data stream is coded and interleaved by a respective set of encoder 512 and channel interleaver 514. The $N_D$ coded data streams are then provided to modulator 420a.

In this embodiment, modulator 420a includes $N_D$ symbol mapping elements 522a through 522D, a Vector rotator 524, and $N_T$ (OFDM) modulators. Each OFDM modulator includes an inverse fast Fourier transform (IFFT) unit 526 and a cyclic prefix generator 528. Each of the $N_D$ coded data streams is symbol mapped by a respective symbol mapping element 522 to provide a respective stream of modulation symbols, which is referred to as a transmitted symbol stream. Vector rotator 524 then performs the DFT and phase shifting and provides $N_T$ symbol streams to the $N_T$ OFDM modulators.

Within each OFDM modulator, for each symbol period, $N_F$ symbols for the $N_F$ sub-carriers are transformed by IFFT unit 526 to obtain a corresponding time-domain "transformed" symbol that includes $N_F$ samples. To combat frequency selective fading, cyclic prefix generator 528 repeats a portion of each transformed symbol to obtain a corresponding OFDM symbol. A stream of OFDM symbols is formed for each transmit antenna and further processed by an associated transmitter 422 to obtain an RF modulated signal. $N_T$ RF modulated signals are generated and transmitted in parallel from the $N_T$ transmit antennas.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 432 or 472 in FIG. 4) and executed by a processor (e.g., controller 430 or 470). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting a number of streams of modulation symbols by a multi-antenna transmitter in a wireless communication network, the method comprising:

transforming a first number (N1) of streams of modulation symbols to a second number (N2) of streams of symbols, N1 being smaller than N2; and transmitting the second number of streams of symbols by a transmitter comprising N2 antennas, wherein said transforming includes operating on the first number of streams of modulation symbols by a vector rotation operation, wherein the vector rotation operation includes a discrete Fourier transformation, and wherein said operating includes operating the discrete Fourier transformation, represented by a unitary square matrix of a dimension equal to N2, on the first number of streams of modulation symbols after being augmented by a third number (N3) of known pilots;

wherein said unitary square matrix is defined by:

$$D = \frac{1}{\sqrt{N_T}}$$

$$\begin{bmatrix} 1 & 1 & 1 & \cdots & 1 \\ 1 & e^{j\frac{2\pi}{N_T}} & e^{j\frac{2\pi}{N_T}\cdot 2} & & \\ 1 & e^{j\frac{2\pi}{N_T}\cdot 2} & e^{j\frac{2\pi}{N_T}\cdot 2\cdot 2} & & \\ & & & \ddots & \\ \vdots & & d_{P,q} = e^{j\frac{2\pi}{N_T}(P-1)(q-1)} & & \\ 1 & & & \ddots & \\ & & & & e^{j\frac{2\pi}{N_T}(N_T-1)^2} \end{bmatrix}_{N_T \times N_T}$$

2. A method for transmitting a number of streams of modulation symbols by a multi-antenna transmitter in a wireless communication network, the method comprising:

transforming a first number (N1) of streams of modulation symbols to a second number (N2) of streams of symbols, the first number being smaller than the second number; and transmitting the second number of streams of symbols by a transmitter comprising the second number of antennas, wherein said transforming includes operating on the first number of streams of modulation symbols by a vector rotation operation, wherein the vector rotation operation includes a discrete Fourier transformation, and p1 wherein the vector rotation operation includes phase shifting N2 outputs of the discrete Fourier transformation, wherein said phase shifting includes operating on the N2 outputs of the discrete Fourier transformation by a unitary diagonal square matrix, wherein said unitary diagonal square matrix is defined by:

$$\Delta = \begin{bmatrix} e^{j\theta_1} & & & \\ & e^{j\theta_2} & & O \\ & & \ddots & \\ & O & & e^{j\theta_{N_T}} \end{bmatrix}_{N_T \times N_T}.$$

3. An apparatus for transmitting a number of streams of modulation symbols by a multi-antenna transmitter in a wireless communication network, comprising:

means for transforming a first number (N1) of streams of modulation symbols to a second number (N2) of streams of symbols, N1 being smaller than N2, wherein said means for transforming includes means for vector rotating the first number of streams of modulation symbols, wherein the means for vector rotating includes means for performing discrete Fourier transformation, and wherein said means for performing includes means for operating the discrete Fourier transformation, represented by a unitary square matrix of a dimension equal to N2, on the first number of streams of modulation symbols after being augmented by a third number (N3) of known pilots; and means for transmitting the second number of streams of symbols by a transmitter comprising N2 antennas wherein said unitary square matrix is defined by:

$$D = \frac{1}{\sqrt{N_T}}$$

$$\begin{bmatrix} 1 & 1 & 1 & \cdots & 1 \\ 1 & e^{j\frac{2\pi}{N_T}} & e^{j\frac{2\pi}{N_T}\cdot 2} & & \\ 1 & e^{j\frac{2\pi}{N_T}\cdot 2} & e^{j\frac{2\pi}{N_T}\cdot 2\cdot 2} & & \\ & & & \ddots & \\ \vdots & & d_{P,q} = e^{j\frac{2\pi}{N_T}(P-1)(q-1)} & & \\ 1 & & & \ddots & \\ & & & & e^{j\frac{2\pi}{N_T}(N_T-1)^2} \end{bmatrix}_{N_T \times N_T}$$

4. An apparatus for transmitting a number of streams of modulation symbols by a multi-antenna transmitter in a wireless communication network, comprising:

means for transforming a first number (N1) of streams of modulation symbols to a second number (N2) of streams of symbols, the first number being smaller than the second number, wherein said means for transforming includes means for vector rotating the first number of streams of modulation symbols, wherein the means for vector rotating includes means for performing discrete Fourier transformation, and wherein the means for vector rotating includes means for phase shifting N2 outputs of the discrete Fourier transformation, wherein said means for phase shifting includes means for operating on the N2 outputs of the discrete Fourier transformation by a unitary diagonal square matrix, and wherein said unitary diagonal square matrix is defined by:

$$\Delta = \begin{bmatrix} e^{j\theta_1} & & & \\ & e^{j\theta_2} & & \text{\Large 0} \\ & & \ddots & \\ & \text{\Large 0} & & e^{j\theta_{N_T}} \end{bmatrix}_{N_T \times N_T}.$$

5. A non-transitory computer-readable medium embodying means for implementing a method for transmitting a number of streams of modulation symbols by a multi-antenna transmitter in a wireless communication network, the method comprising:
  transforming a first number (N1) of streams of modulation symbols to a second number (N2) of streams of symbols, N1 being smaller than N2,
    wherein said transforming includes operating on the first number of streams of modulation symbols by a vector rotation operation,
    wherein the vector rotation operation includes a discrete Fourier transformation,
    wherein said operating includes operating the discrete Fourier transformation, represented by a unitary square matrix of a dimension equal to N2, on the first number of streams of modulation symbols after being augmented by a third number (N3) of known pilots; and
  transmitting the second number of streams of symbols by a transmitter comprising N2 antennas,
wherein said unitary square matrix is defined by:

$$D = \frac{1}{\sqrt{N_T}} \begin{bmatrix} 1 & 1 & 1 & \cdots & 1 \\ 1 & e^{j\frac{2\pi}{N_T}} & e^{j\frac{2\pi}{N_T} \cdot 2} & & \\ 1 & e^{j\frac{2\pi}{N_T} \cdot 2} & e^{j\frac{2\pi}{N_T} \cdot 2 \cdot 2} & & \\ & & \ddots & & \\ \vdots & & & d_{P,q} = e^{j\frac{2\pi}{N_T}(P-1)(q-1)} & \\ 1 & & & \ddots & \\ & & & & e^{j\frac{2\pi}{N_T}(N_T-1)^2} \end{bmatrix}_{N_T \times N_T}.$$

6. A non-transitory computer-readable medium embodying means for implementing a method for transmitting a number of streams of modulation symbols by a multi-antenna transmitter in a wireless communication network, the method comprising:
  transforming a first number (N1) of streams of modulation symbols to a second number (N2) of streams of symbols, the first number being smaller than the second number,
    wherein said transforming includes operating on the first number of streams of modulation symbols by a vector rotation operation,
    wherein the vector rotation operation includes a discrete Fourier transformation, and
    wherein the vector rotation operation includes phase shifting N2 outputs of the discrete Fourier transformation,
    wherein said phase shifting includes operating on the N2 outputs of the discrete Fourier transformation by a unitary diagonal square matrix, and
    wherein said unitary diagonal square matrix is defined by:

$$\Delta = \begin{bmatrix} e^{j\theta_1} & & & \\ & e^{j\theta_2} & & \text{\Large 0} \\ & & \ddots & \\ & \text{\Large 0} & & e^{j\theta_{N_T}} \end{bmatrix}_{N_T \times N_T}.$$

7. At least one processor programmed to implement a method for transmitting a number of streams of modulation symbols by a multi-antenna transmitter in a wireless communication network, the method comprising:
  transforming a first number (N1) of streams of modulation symbols to a second number (N2) of streams of symbols, N1 being smaller than N2,
    wherein said transforming comprises operating on the first number of streams of modulation symbols by a vector rotation operation,
    wherein the vector rotation operation further comprises a discrete Fourier transformation, and
    wherein said operating further comprises operating the discrete Fourier transformation, represented by a unitary square matrix of a dimension equal to N2, on the first number of streams of modulation symbols after being augmented by a third number (N3) of known pilots; and
  transmitting the second number of streams of symbols by a transmitter comprising N2 antennas,
  wherein said unitary square matrix is defined by:

$$D = \frac{1}{\sqrt{N_T}} \begin{bmatrix} 1 & 1 & 1 & \cdots & 1 \\ 1 & e^{j\frac{2\pi}{N_T}} & e^{j\frac{2\pi}{N_T} \cdot 2} & & \\ 1 & e^{j\frac{2\pi}{N_T} \cdot 2} & e^{j\frac{2\pi}{N_T} \cdot 2 \cdot 2} & & \\ & & \ddots & & \\ \vdots & & & d_{P,q} = e^{j\frac{2\pi}{N_T}(P-1)(q-1)} & \\ 1 & & & \ddots & \\ & & & & e^{j\frac{2\pi}{N_T}(N_T-1)^2} \end{bmatrix}_{N_T \times N_T}.$$

8. At least one processor programmed to implement a method for transmitting a number of streams of modulation symbols by a multi-antenna transmitter in a wireless communication network, the method comprising:
   transforming a first number (N1) of streams of modulation symbols to a second number (N2) of streams of symbols, the first number being smaller than the second number,
   wherein said transforming includes operating on the first number of streams of modulation symbols by a vector rotation operation,
   wherein the vector rotation operation includes a discrete Fourier transformation, and
   wherein the vector rotation operation further comprises phase shifting N2 outputs of the discrete Fourier transformation,
   wherein said phase shifting further comprises operating on the N2 outputs of the discrete Fourier transformation by a unitary diagonal square matrix, and
   wherein said unitary diagonal square matrix is defined by:

$$\Delta = \begin{bmatrix} e^{j\theta_1} & & & \\ & e^{j\theta_2} & & O \\ & & \ddots & \\ & O & & e^{j\theta_{N_T}} \end{bmatrix}_{N_T \times N_T}.$$

9. An apparatus for transmitting a number of streams of modulation symbols by a multi-antenna transmitter in a wireless communication network, comprising:
   a transformation module configured to perform transformation of a first number (N1) of streams of modulation symbols to a second number (N2) of streams of symbols, N1 being smaller than N2,
      wherein the transformation includes a vector rotation operation on the first number of streams of modulation symbols,
      wherein the vector rotation operation includes a performance of a discrete Fourier transformation, and
      wherein said performance includes an operation of the discrete Fourier transformation, represented by a unitary square matrix of a dimension equal to N2, on the first number of streams of modulation symbols after being augmented by a third number (N3) of known pilots; and
   a transmitter comprising N2 antennas and configured to transmit the second number of streams of symbols,
   wherein said unitary square matrix is defined by:

$$D = \frac{1}{\sqrt{N_T}}$$

$$\begin{bmatrix} 1 & 1 & 1 & \cdots & & 1 \\ 1 & e^{j\frac{2\pi}{N_T}} & e^{j\frac{2\pi}{N_T} \cdot 2} & & & \\ 1 & e^{j\frac{2\pi}{N_T} \cdot 2} & e^{j\frac{2\pi}{N_T} \cdot 2 \cdot 2} & & & \\ & & & \ddots & & \\ \vdots & & & & d_{P,q} = e^{j\frac{2\pi}{N_T}(P-1)(q-1)} & \\ 1 & & & & & \ddots \\ & & & & & e^{j\frac{2\pi}{N_T}(N_T-1)^2} \end{bmatrix}_{N_T \times N_T}$$

10. An apparatus for transmitting a number of streams of modulation symbols by a multi-antenna transmitter in a wireless communication network, comprising:
   a transformation module configured to perform transformation of a first number (N1) of streams of modulation symbols to a second number (N2) of streams of symbols, N1 being smaller than N2,
   a transmitter comprising N2 antennas and configured to transmit the second number of streams of symbols,
   wherein said transformation includes operating on the first number of streams of modulation symbols by a vector rotation operation,
   wherein the vector rotation operation includes a discrete Fourier transformation, and
   wherein the vector rotating operation comprises phase shifting N2 outputs of the discrete Fourier transformation,
   wherein said phase shifting further comprises operating on the N2 outputs of the discrete Fourier transformation by a unitary diagonal square matrix, and
   wherein said unitary diagonal square matrix is defined by:

$$\Delta = \begin{bmatrix} e^{j\theta_1} & & & \\ & e^{j\theta_2} & & O \\ & & \ddots & \\ & O & & e^{j\theta_{N_T}} \end{bmatrix}_{N_T \times N_T}.$$

* * * * *